US012640608B2

(12) United States Patent
Yang et al.

(10) Patent No.: US 12,640,608 B2
(45) Date of Patent: May 26, 2026

(54) RADIAL FLUX ELECTRIC MOTOR WITH AIRGAP COOLING

(71) Applicant: GM GLOBAL TECHNOLOGY OPERATIONS LLC, Detroit, MI (US)

(72) Inventors: Xiaofeng Yang, Troy, MI (US); Peng Peng, Columbus, OH (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 294 days.

(21) Appl. No.: 18/474,605

(22) Filed: Sep. 26, 2023

(65) Prior Publication Data

US 2025/0105688 A1     Mar. 27, 2025

(51) Int. Cl.
    *H02K 1/32*        (2006.01)
    *H02K 7/00*        (2006.01)

(52) U.S. Cl.
    CPC ............... *H02K 1/32* (2013.01); *H02K 7/003* (2013.01); *H02K 2201/03* (2013.01)

(58) Field of Classification Search
    CPC ........ H02K 1/20; H02K 1/32; H02K 2201/03; H02K 7/003; H02K 9/06; H02K 9/19
    USPC .......................................................... 310/61
    See application file for complete search history.

(56) References Cited

U.S. PATENT DOCUMENTS

| | | | | |
|---|---|---|---|---|
| 4,352,034 A * | 9/1982 | Karhan | ..................... | H02K 1/20 |
| | | | | 310/55 |
| 5,189,325 A * | 2/1993 | Jarczynski | ............. | H02K 9/197 |
| | | | | 310/61 |
| 5,994,804 A * | 11/1999 | Grennan | .................. | H02K 9/06 |
| | | | | 310/58 |
| 7,600,961 B2 * | 10/2009 | Abdallah | .............. | F04D 25/045 |
| | | | | 415/58.4 |
| 8,896,167 B2 * | 11/2014 | McKinzie | ................ | H02K 9/00 |
| | | | | 310/60 A |
| 8,963,384 B2 * | 2/2015 | Kirkley, Jr. | .............. | H02K 1/32 |
| | | | | 310/58 |

(Continued)

FOREIGN PATENT DOCUMENTS

| | | |
|---|---|---|
| DE | 102015223073 A1 | 5/2017 |
| DE | 102016210930 A1 | 12/2017 |

(Continued)

OTHER PUBLICATIONS

German Search Report dated Aug. 2, 2024.

*Primary Examiner* — Alex W Mok
(74) *Attorney, Agent, or Firm* — Quinn IP Law

(57)           ABSTRACT

A radial flux electric motor includes a stator having a radially inner stator surface and a rotor mounted inside the stator. The rotor defines a rotational axis and has axially opposite rotor ends and a radially outer rotor surface positioned proximate the radially inner stator surface, thereby establishing an airgap therebetween. The rotor also includes a fluid circulation arrangement having at least one fluid channel extending through the rotor to the radially outer rotor surface and configured to receive a liquid via a first passage and a gas via at least one second passage. The fluid circulation arrangement is also configured to direct the liquid and the gas, via centrifugal force, into the airgap as the rotor rotates inside the stator sufficiently to discharge the liquid and the gas out of the airgap at the axially opposite ends of the rotor, thereby cooling the electric motor.

20 Claims, 5 Drawing Sheets

(56)        References Cited

U.S. PATENT DOCUMENTS

| | | | | | |
|---|---|---|---|---|---|
| 11,300,365 | B2 * | 4/2022 | Miller | ..................... | F28F 27/02 |
| 2019/0036438 | A1 * | 1/2019 | Murase | .................. | H02K 9/225 |
| 2020/0244123 | A1 * | 7/2020 | Kang | ....................... | H02K 9/19 |
| 2020/0244124 | A1 * | 7/2020 | Kang | ....................... | H02K 1/32 |
| 2022/0190678 | A1 * | 6/2022 | Folkesson | ............ | H02K 7/1008 |
| 2023/0170762 | A1 | 6/2023 | Choi et al. | | |

FOREIGN PATENT DOCUMENTS

| | | | | | |
|---|---|---|---|---|---|
| DE | 102021200283 | A1 | | 7/2022 | |
| EP | 3346592 | A1 * | 7/2018 | .............. | H02K 1/32 |

* cited by examiner

RADIAL FLUX ELECTRIC MOTOR WITH AIRGAP COOLING

INTRODUCTION

The disclosure relates to a radial flux electric motor with airgap cooling.

An electric motor is a machine that converts electric energy into mechanical energy. Electric motors may be configured as an alternating current (AC) or a direct current (DC) type. An electric motor's operation is based on an electromagnetic interaction between permanent magnets and the magnetic field created by the machine's selectively energized coils. Electric motors are classified into two categories based on the direction of the magnetic field—axial flux motors and radial flux motors.

As a byproduct of generated torque, electric motors produce thermal energy which may adversely affect motor performance and reliability. Cooling of an electric motor may therefore remove thermal stress seen by motor poles or windings and provide longer motor life under or close to peak load. Additionally, electric motor cooling may generally quiet motor operation and enhance motor operation at higher speeds, as well as facilitate reduced motor inertia and packaging.

SUMMARY

A radial flux electric motor includes a stator having a radially inner stator surface and a rotor mounted inside the stator. The rotor defines a rotational axis and has axially opposite rotor ends and a radially outer rotor surface positioned proximate the radially inner stator surface, thereby establishing an airgap therebetween. The rotor also includes a fluid circulation arrangement having at least one fluid channel extending through the rotor to the radially outer rotor surface and configured to receive a liquid via a first passage and a gas via at least one second passage. The fluid circulation arrangement is also configured to direct the liquid and the gas, via centrifugal force, into the airgap as the rotor rotates inside the stator sufficiently to discharge the liquid and the gas out of the airgap at the axially opposite ends of the rotor, thereby cooling the electric motor.

The fluid circulation arrangement may additionally include a rotor shaft positioned coaxially with the rotational axis, fixed to the rotor, and define the first passage configured to receive the liquid.

The rotor shaft may additionally define the at least one second passage configured to receive the gas.

The rotor may define the at least one second passage.

The fluid circulation arrangement may include a plurality of fluid passages. Each subject fluid passage may extend through the rotor to the radially outer rotor surface.

The fluid circulation arrangement may additionally include a rotor impeller defining the plurality of fluid channels. The radially outer rotor surface may define circumferentially distributed apertures fluidly connected to the respective plurality of fluid channels.

The rotor impeller may be arranged perpendicular to the rotational axis centrally within the rotor.

The rotor may have a three-piece structure, including a first lateral rotor portion and a second lateral rotor portion sandwiching the rotor impeller.

The rotor impeller may have a laminate impeller structure, including a first impeller lamination and a second impeller lamination sandwiching a third impeller lamination. The first and second impeller laminations together with the first and second lateral rotor portions may define each of the fluid channels. The third impeller lamination and the first and second lateral rotor portions together may define a first part of each fluid channel when the third impeller lamination is sandwiched between the first and second impeller laminations. The first and second impeller laminations together may define a second part of each fluid channel when the third impeller lamination is sandwiched therebetween.

The liquid may be pressurized oil and the gas is air.

A motor vehicle having such a radial flux electric motor as described above is also disclosed.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1:
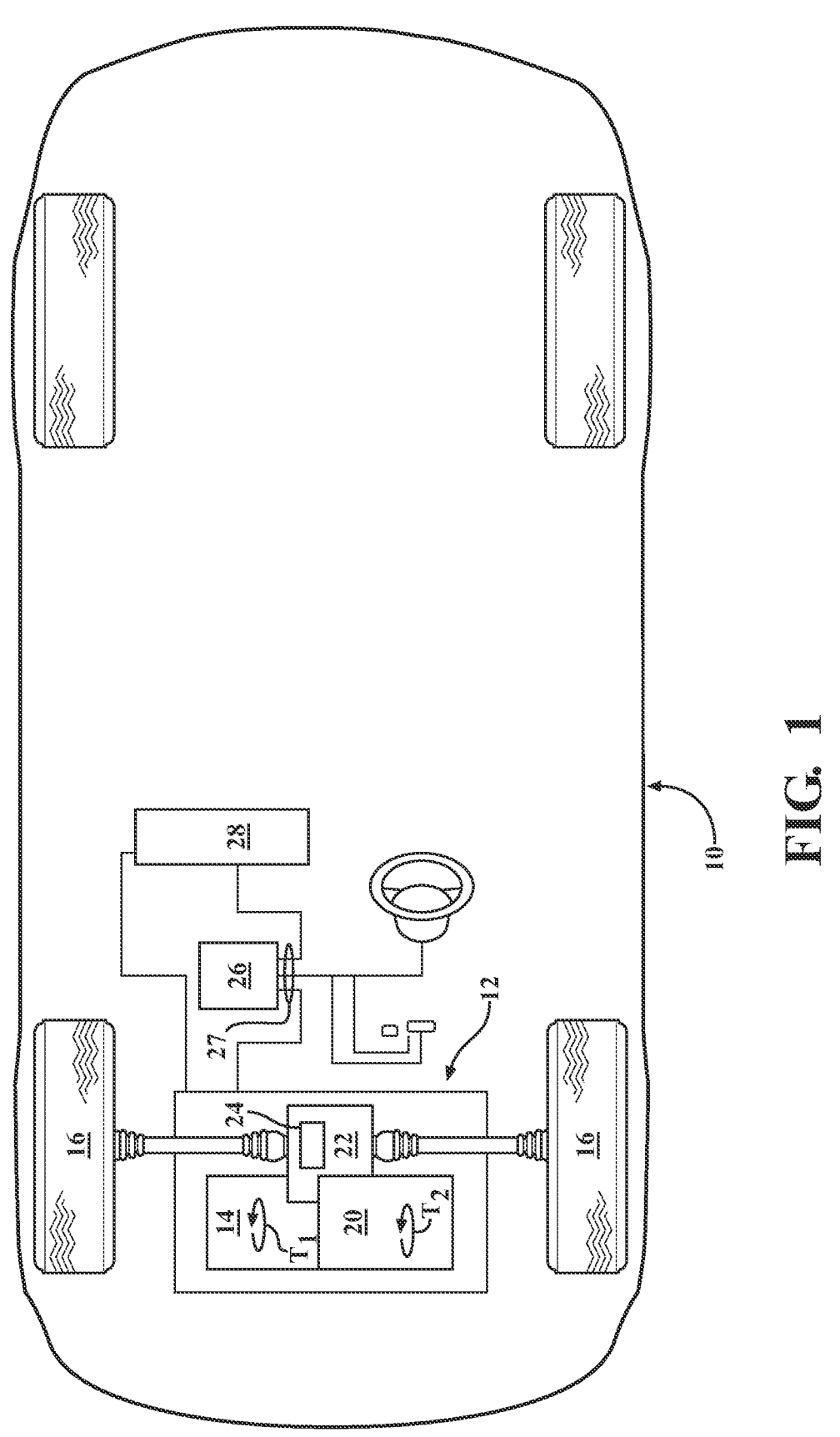
FIG. 1 is a schematic illustration of a motor vehicle having a powertrain employing a radial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to FIG. 1, a motor vehicle 10 having a powertrain 12 is depicted. The motor vehicle 10 may include, but not be limited to, a commercial vehicle, industrial vehicle, passenger vehicle, aircraft, watercraft, train or the like. It is also contemplated that the motor vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque $T_1$ (shown in FIG. 1) for propulsion of the motor vehicle 10 via driven wheels 16 relative to a road surface. The motor-generator 14 may be configured as a radial flux electric motor, where the magnetic flux is generated perpendicular to the motor's axis of rotation and the airgap between the machine's rotor and stator is arranged concentrically with the rotational axis.

As shown in FIG. 1, the powertrain 12 may also include a second power-source 20, such as an internal combustion engine configured to generate a second power-source torque $T_2$. The power-sources 14 and 20 may act in concert to power the motor vehicle 10 and be operatively connected to a transmission assembly 22. The transmission assembly 22 may be configured to transmit first and/or second power-source torques $T_1$, $T_2$ to a final drive unit 24, which in turn may be connected to the driven wheels 16. The first power-source 14, which for the remainder of the present disclosure will be referred to as a motor-generator, may, for example, be mounted to the second power-source 20, mounted to (or incorporated into) the transmission assembly 22, mounted to the final drive unit 24, or be a stand-alone assembly mounted to the structure of the vehicle 10. As shown, the motor vehicle 10 additionally includes a programmable electronic controller 26 configured to communicate via a high-voltage BUS 27 and control the powertrain 12 to generate a predetermined amount of power-source torque (sum of $T_1$ and $T_2$), and various other vehicle systems. Motor vehicle 10 additionally includes an energy storage system 28, such as one or more batteries, configured to generate and store electrical energy for powering the power-sources 14 and 20.

Figure 2:
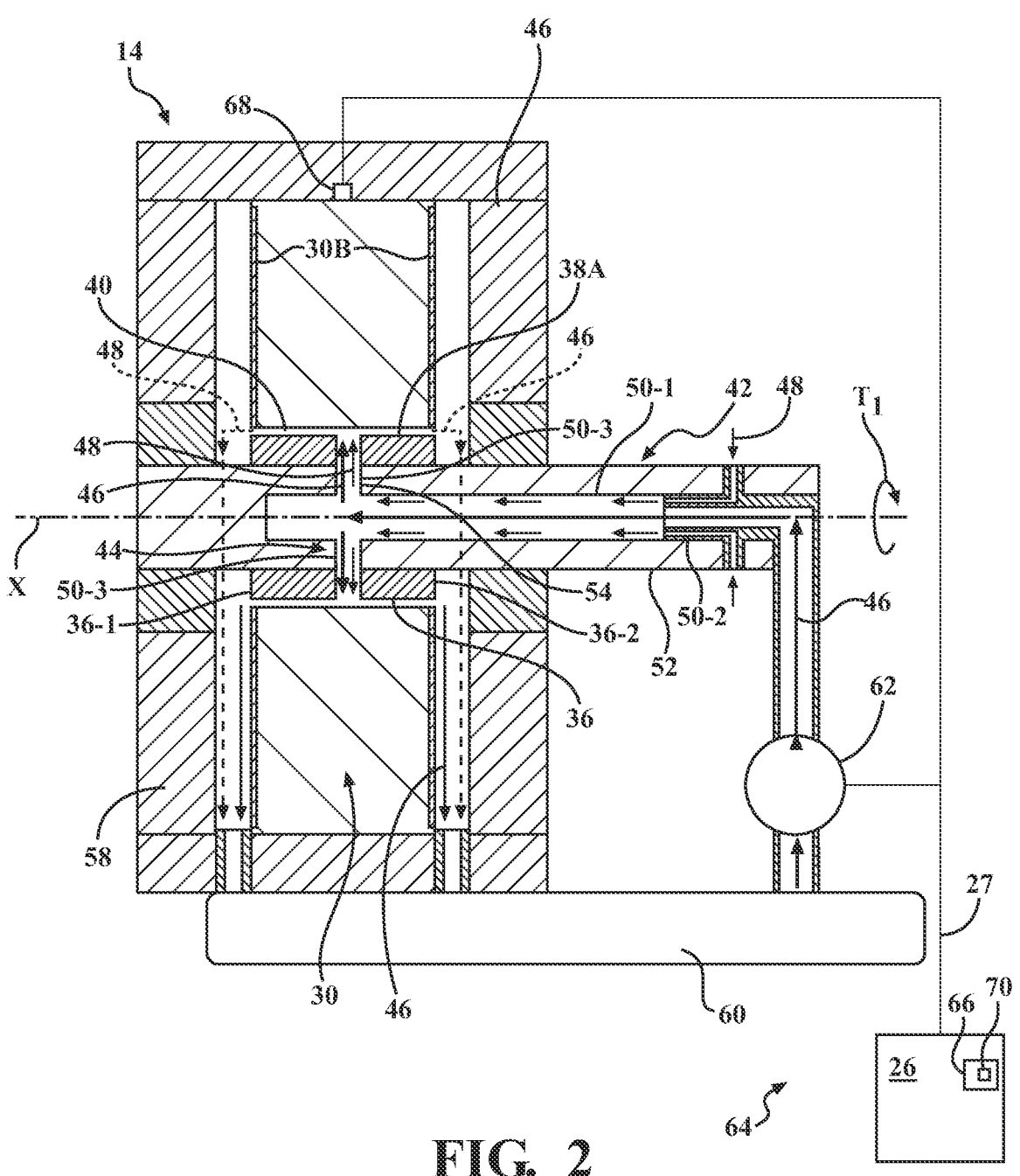
FIG. 2 is a schematic close-up cross-sectional side view of the radial flux motor-generator shown in FIG. 1, depicting a stator, an internally arranged coaxial rotor and a fluid circulation arrangement including fluid channel(s) extending radially outwardly across the rotor, according to the disclosure.
Figure 3:
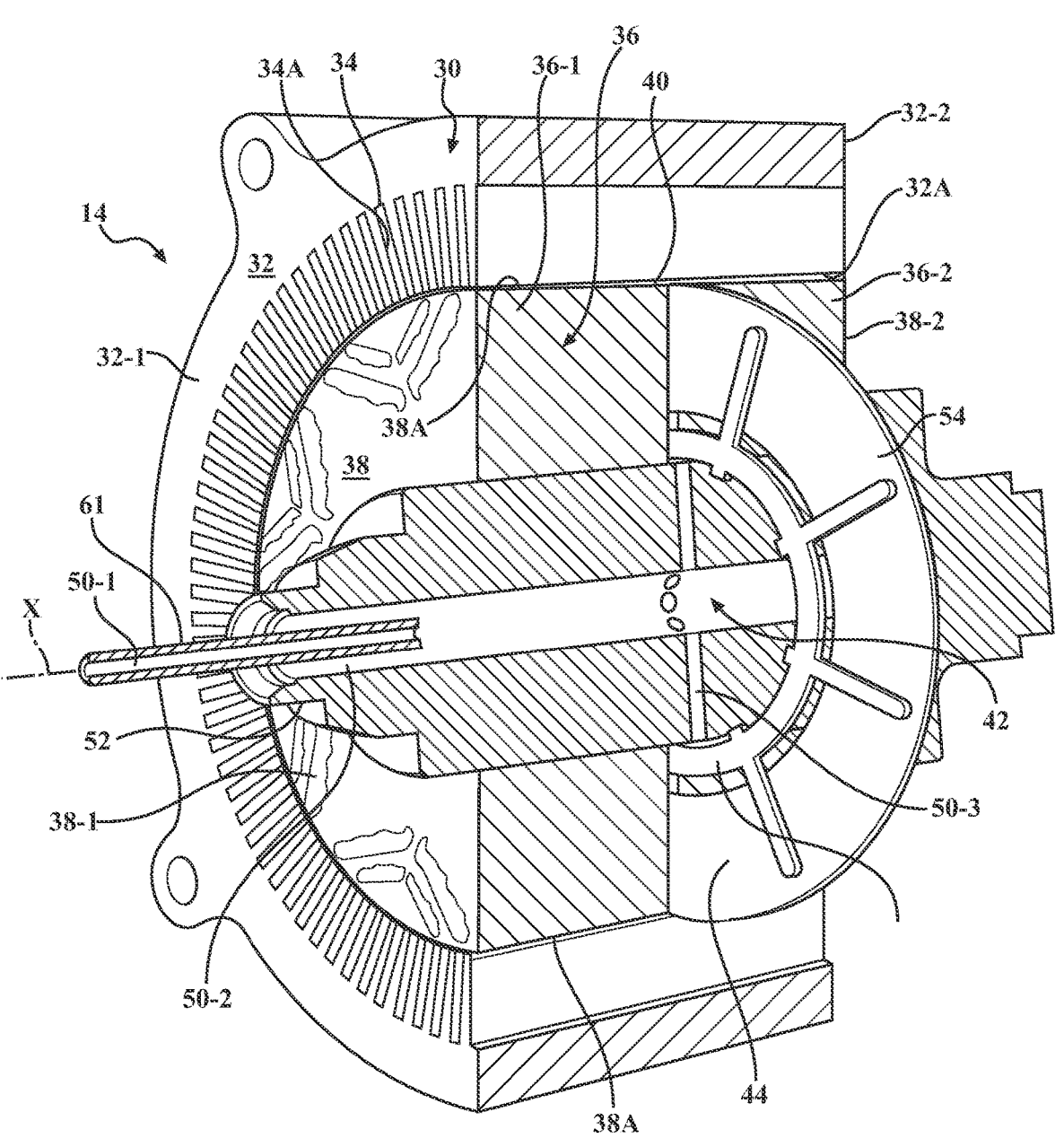
FIG. 3 is a schematic partial cut-away perspective view of the fluid circulation arrangement shown in FIG. 2 having an embodiment of a rotor impeller establishing fluid channels in communication with liquid and gas passages, according to the disclosure.

FIG. 2 illustrates a general cross-section of the radial flux motor-generator 14. As shown for example in FIG. 3, the motor-generator 14 includes a rotationally fixed stator 30 having a generally cylindrical core 32 and winding slots 34. As also shown in FIG. 3, the stator core 32 also has a radially inner stator core surface 32A. The motor-generator 14 also includes a rotor 36 defining a rotational axis X and mounted for rotation inside the stator 30. The stator 30 may include multiphase AC windings 34A arranged within the winding slots 34, wherein the windings receive multiphase AC from a power inverter to establish a rotating magnetic field exerting torque upon the rotor 36. The stator windings 34A are generally contained within the winding slots 34 with end turns of the windings extending beyond the limits of the cylindrical core 32 at axially opposite stator ends—a first end 32-1 and a second end 32-2.

As shown in FIG. 3, the rotor 36 has a ferromagnetic rotor core 38. The rotor core 38 has axially opposite rotor core ends—a first end 38-1 and a second end 38-2. The rotor core 38 may be constructed from a relatively soft magnetic material, such as laminated silicon steel. In a permanent magnet machine, the stacked rotor laminations may include voids forming interior pockets for carrying permanent magnets. In an induction machine, the stacked laminations may include peripheral slots for carrying conduction bars. Alternative rotor constructions are also used in the industry and may include, for example, surface mounted permanent magnet and wire wound rotors. The rotor core 38 has a radially outer rotor surface 38A positioned proximate the radially inner stator core surface 32A, thereby establishing an airgap 40 therebetween (shown in FIGS. 2 and 3). The airgap 40 extends between the axially opposite first end 38-1 and second end 38-2 of the rotor core.

As shown in FIGS. 2 and 3, rotor 36 also includes a fluid circulation arrangement 42 having one or more fluid channels 44, each extending radially through the rotor to the radially outer rotor surface 38A. The fluid circulation arrangement 42 is configured to receive a liquid 46 via a first passage 50-1 and a gas 48 via one or more second passages 50-2 along the rotational axis X. Specifically, liquid 46 may be a pressurized oil and the gas 48 may be air. The fluid circulation arrangement 42 is further configured to direct the liquid and the gas 46, 48, via centrifugal force, into the airgap 40 as the rotor 36 rotates inside the stator 30 sufficiently to discharge the liquid and the gas out of the airgap at the axially opposite ends 38-1, 38-2 of rotor 36. The fluid circulation arrangement 42 is thereby configured to cool the motor-generator 14.

Figure 5:
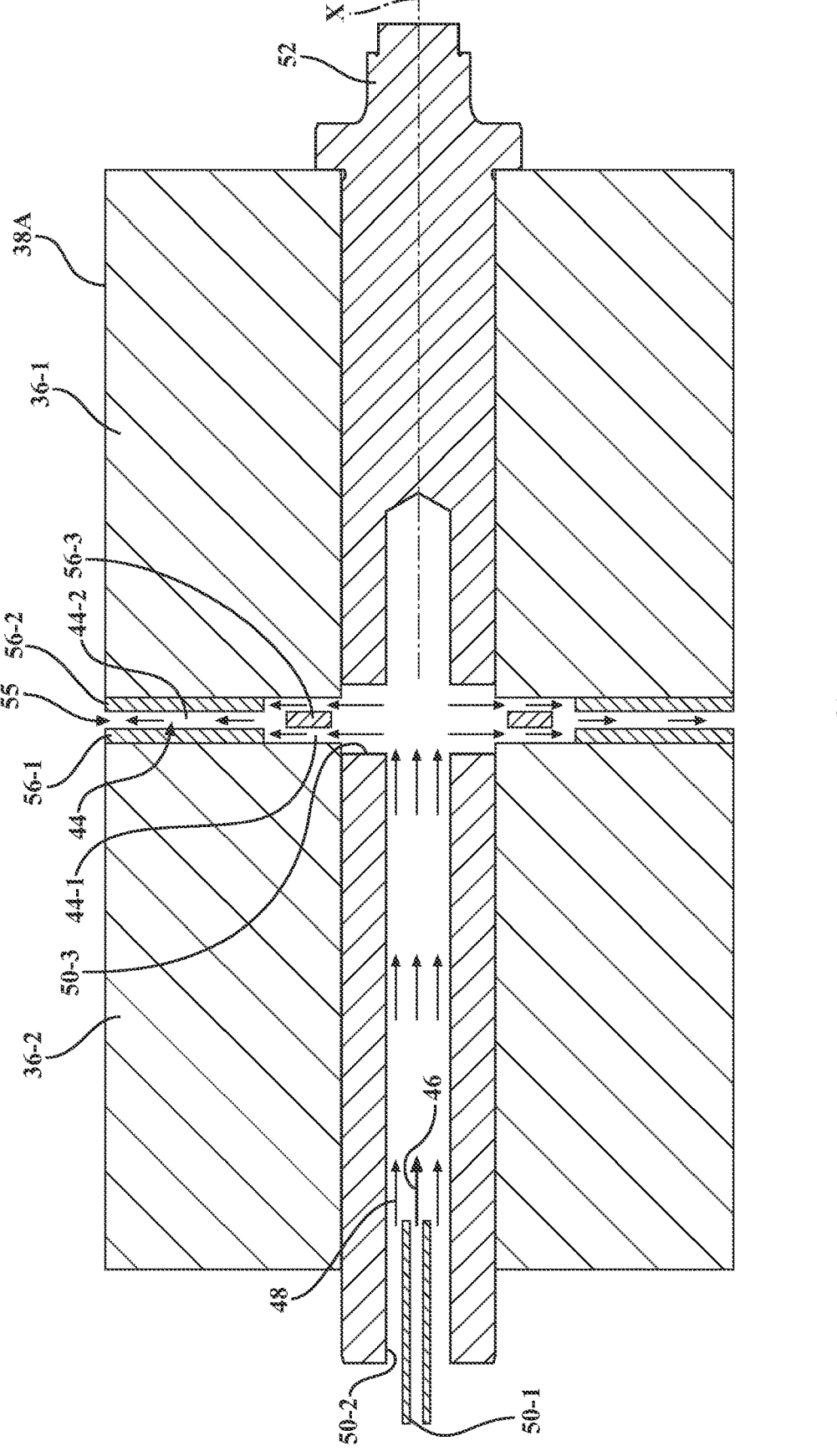
FIG. 5 is a schematic cross-sectional side view of the rotor impeller laminate impeller structure shown in FIGS. 3-4, illustrating the first and second impeller laminations together with the first and second lateral rotor portions defining the fluid channels of the fluid circulation arrangement, according to the disclosure.

With continued reference to FIGS. 2 and 3, the fluid circulation arrangement 42 may additionally include a rotor shaft 52 positioned coaxially with the rotor 36. The rotor shaft 52 may be fixed to the rotor 36 and define the first passage 50-1 for supplying the liquid 46 to the fluid channel (s) 44. Specifically, the first passage 50-1 may be arranged along the rotational axis X and be configured to receive pressurized liquid 46 from one end of the rotor shaft 52. From the first passage 50-1, the liquid 46 may flow through liquid inlets which may be configured as one or more third passages 50-3 into the internal rotor fluid channels 44. As shown in FIGS. 2, 3, and 5, the third passage(s) 50-3 may be cross-drilled holes arranged substantially perpendicular to the first passage 50-1. As the radial flux motor-generator 14 generates the first power-source torque $T_1$, the rotor shaft 52 spins about the axis of rotation X together with the rotor 36. The rotor shaft 52 may be rotatably supported at both rotor core 38 ends (the first end 38-1 and the second end 38-2) by bearings (not shown) and may transfer the first power-source torque $T_1$ generated by the rotor 36 to the driven wheels 16 via the transmission assembly 22 (shown in FIG. 1).

As shown in FIG. 3, the rotor shaft 52 may further define the second passage 50-2 for supplying the gas 48 to the fluid channel(s) 44. Alternatively, the rotor 36 may define the second passage(s) 50-2 (not shown). In the embodiment shown in FIG. 3, the second passage(s) 50-2 may be arranged substantially parallel to the rotational axis X. The gas 48 may be drawn into the second passage 50-2 by the rotation of the rotor 36, with a vacuum generated in the second passage resulting from the communication of the second passage with the radially disposed fluid channel(s) 44. As shown in FIG. 3, the first and second passages 50-1, 50-2 are in fluid communication with each of the fluid channels 44 in the fluid circulation arrangement 42. The liquid and gaseous fluid 46, 48 may therefore be combined within the fluid channel(s) 44 thereby establishing a two-phase mixture subsequently injected into the air gap 40.

With reference to FIGS. 2-5, the fluid circulation arrangement 42 may additionally include a rotor impeller 54 defining a plurality of fluid channels 44. The rotor impeller 54 may be arranged perpendicular to the rotational axis X and fixed centrally within the rotor 36. As shown in FIG. 3, the plurality of channels 44 may define a radially disposed channel pattern defined by the rotor impeller 54. As shown in FIG. 3, the channels 44 extend through the rotor impeller 54 to the radially outer rotor surface 38A. In such an embodiment, the radially outer rotor surface 38A defines circumferentially distributed apertures 55 (shown in FIG. 5) fluidly connected to the respective plurality of fluid channels 44. As such, the rotor 36 may have a three-piece structure (shown in FIGS. 3 and 5), including a first lateral rotor portion 36-1 and a second lateral rotor portion 36-2 sandwiching the rotor impeller 54.

Figure 4:
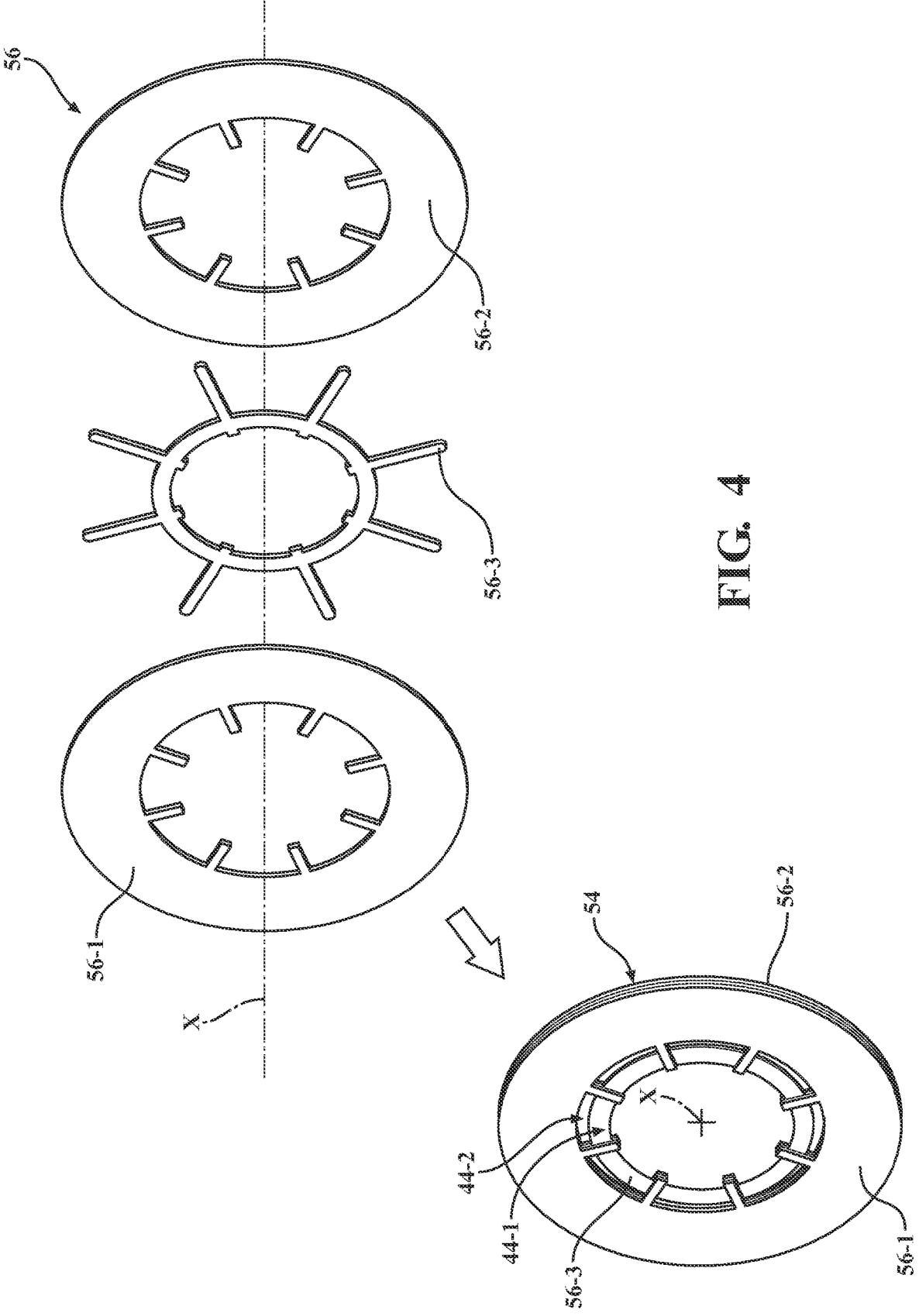
FIG. 4 is a schematic perspective view of an embodiment of the rotor impeller shown in FIG. 3, illustrating a laminate impeller structure of the rotor impeller, including a first impeller lamination and a second impeller lamination sandwiching a third impeller lamination, according to the disclosure.

As shown in FIG. 4, the rotor impeller 54 may have a laminate impeller structure 56. The laminate impeller structure 56 may have a first impeller lamination 56-1 and a second impeller lamination 56-2 sandwiching a third impeller lamination 56-3. In other words, the first and second impeller laminations 56-1, 56-2 are arranged on opposite sides of the third impeller lamination 56-3. Although the first and second impeller laminations 56-1, 56-2 may have identical form and structure, the third impeller lamination 56-3 is specifically shaped to establish voids in specific areas between the first and second impeller laminations when the three laminations are stacked together. Such an arrangement of the three laminations 56-1, 56-2, 56-3 permits a continuous path to be generated therebetween for the fluid channels 44.

As shown in FIG. 3, when installed between the first and second lateral rotor portions 36-1, 36-2, the first, second, and third impeller lamination 56-1, 56-2, 56-3 generate the fluid channels 44. Accordingly, the first, second, and third impeller lamination 56-1, 56-2, 56-3 together with the first and second lateral rotor portions 36-1, 36-2 may define each of the fluid channels 44 in the rotor impeller 54. As illustrated in FIG. 5, the third impeller lamination 56-3 and the first and second lateral rotor portions 36-1, 36-2 together define a first part 44-1 of each fluid channel when the third impeller lamination is sandwiched between the first and second impeller laminations 56-1, 56-2. Additionally, when the third impeller 56-3 lamination is sandwiched therebetween the first and second impeller laminations 56-1, 56-2, the first and second impeller laminations together define a second part 44-2 of each fluid channel 44. As a result, the first part 44-1 of channel 44 is formed closest to the rotor shaft 52 around the third impeller lamination 56-3. The second part 44-2 of the channel 44 is then formed radially farther out, between the first and second laminations 56-1, 56-2. The first and second parts 44-1, 44-2 of the channel are therefore in continuous fluid communication and supply the liquid 46 and gas 48 into the airgap 40 during operation of the radial flux motor-generator 14.

With resumed reference to FIG. 2, the radial flux motor-generator 14 also includes a motor housing 58 defining a fluid sump 60. The first passage 50-1 may be defined by a stationary tube 61 mounted to the motor housing 58 and extending through the center of the rotor shaft 52 thereby introducing the liquid 46 along the rotational axis X generally parallel to the flow of gas 48. The fluid sump 60 is configured to collect the liquid 46 after the liquid has been discharged out of the airgap 40 and was returned within or by the housing 58 to the fluid sump via gravity. Each of the fluid sump 60 and the first fluid passage 50-1 in the rotor shaft 52 is in fluid communication with a fluid pump 62. The fluid pump 62 is regulated via the electronic controller 26 and configured to pressurize and circulate the liquid 46, i.e., supply the liquid from the fluid sump 60 to the first fluid passage 50-1. The fluid pump 62 may be part of an electric motor cooling system 64 operated via the electronic controller 26.

The electronic controller 26 may be programmed with an algorithm 66 to regulate the fluid pump 62 using detected, such as via corresponding sensors (indicated generally via numeral 68) or calculated variables. Such variables may, for example, be motor phase current, motor rotational speed, temperature of the stator 30 and/or the temperature of the rotor 36, and a flow rate of the liquid 46 in the radial flux electric motor 14. The temperature of the stator 30 and/or of the rotor 36 may be either detected, otherwise determined, or estimated using recent history of other sensor readings, including that of the liquid temperature, and a motor operational map 70 programmed into the controller 26. The electric motor cooling system 64 may therefore be configured to remove thermal stress and, among multiple benefits, provide longer life under higher speeds or close to peak load for the radial flux electric motor 14, such as during propulsion of the motor vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A radial flux electric motor comprising:
   a stator having a radially inner stator surface; and
   a rotor mounted inside the stator, defining a rotational axis, and having axially opposite rotor ends and a radially outer rotor surface positioned proximate the radially inner stator surface, thereby establishing an airgap therebetween;
   wherein;
      the rotor includes a fluid circulation arrangement having at least one fluid channel extending through the rotor to the radially outer rotor surface and configured to receive a liquid via a first passage and a gas via at least one second passage and direct the liquid and the gas, via centrifugal force, into the airgap as the rotor rotates inside the stator sufficiently to discharge the liquid and the gas out of the airgap at the axially opposite ends of the rotor, thereby cooling the electric motor;

the at least one fluid channel includes a plurality of fluid channels, and each fluid channel extends through the rotor to the radially outer rotor surface;

the fluid circulation arrangement additionally includes a rotor impeller defining the plurality of fluid channels, and wherein the radially outer rotor surface defines circumferentially distributed apertures fluidly connected to the respective plurality of fluid channels;

the rotor impeller is arranged perpendicular to the rotational axis centrally within the rotor; and the rotor has a three-piece structure, including a first lateral rotor portion and a second lateral rotor portion sandwiching the rotor impeller.

2. The radial flux electric motor according to claim 1, wherein the fluid circulation arrangement additionally includes a rotor shaft positioned coaxially with the rotor, fixed to the rotor, and defines the first passage.

3. The radial flux electric motor according to claim 2, wherein the rotor shaft defines the at least one second passage.

4. The radial flux electric motor according to claim 2, wherein the rotor defines the at least one second passage.

5. The radial flux electric motor according to claim 1, wherein:

the rotor impeller has a laminate impeller structure, including a first impeller lamination and a second impeller lamination sandwiching a third impeller lamination, and together with the first and second lateral rotor portions defining each of the fluid channels.

6. The radial flux electric motor according to claim 1, wherein the liquid is pressurized oil and the gas is air.

7. A motor vehicle comprising:

a radial flux electric motor configured to generate torque for propulsion of the motor vehicle, the radial flux electric motor including:

a stator having a radially inner stator surface; and a rotor mounted inside the stator, defining a rotational axis, and having axially opposite rotor ends and a radially outer rotor surface positioned proximate the radially inner stator surface, thereby establishing an airgap therebetween;

wherein;

the rotor includes a fluid circulation arrangement having at least one fluid channel extending through the rotor to the radially outer rotor surface and configured to receive a liquid via a first passage and a gas via at least one second passage and direct the liquid and the gas, via centrifugal force, into the airgap as the rotor rotates inside the stator sufficiently to discharge the liquid and the gas out of the airgap at the axially opposite ends of the rotor, thereby cooling the electric motor;

the at least one fluid channel includes a plurality of fluid channels, and each fluid channel extends through the rotor to the radially outer rotor surface;

the fluid circulation arrangement additionally includes a rotor impeller defining the plurality of fluid channels, and wherein the radially outer rotor surface defines circumferentially distributed apertures fluidly connected to the respective plurality of fluid channels;

the rotor impeller is arranged perpendicular to the rotational axis centrally within the rotor; and the rotor has a three-piece structure, including a first lateral rotor portion and a second lateral rotor portion sandwiching the rotor impeller.

8. The motor vehicle according to claim 7, wherein the fluid circulation arrangement additionally includes a rotor shaft positioned coaxially with the rotational axis, fixed to the rotor, and defines the first passage.

9. The motor vehicle according to claim 8, wherein the rotor shaft defines the at least one second passage.

10. The motor vehicle according to claim 8, wherein the rotor defines the at least one second passage.

11. The motor vehicle according to claim 7, wherein:

the rotor impeller has a laminate impeller structure, including a first impeller lamination and a second impeller lamination sandwiching a third impeller lamination, and together with the first and second lateral rotor portions defining each of the fluid channels.

12. The motor vehicle according to claim 7, further comprising a fluid pump configured to pressurize and circulate the liquid.

13. The motor vehicle according to claim 12, further comprising an electronic controller programmed with an algorithm to regulate the fluid pump.

14. The motor vehicle according to claim 13, wherein the electronic controller is in communication with one or more sensors and is configured to regulate the fluid pump using data detected by the one or more sensors.

15. The motor vehicle according to claim 13, wherein the electronic controller is configured to regulate the fluid pump using calculated variables.

16. The motor vehicle according to claim 13, wherein the electronic controller is configured to regulate the fluid pump using a temperature of the stator and/or the rotor determined using detected temperature of the liquid and a motor operational map programmed into the controller.

17. A radial flux electric motor comprising:

a stator having a radially inner stator surface; and a rotor mounted inside the stator, defining a rotational axis, and having axially opposite rotor ends and a radially outer rotor surface positioned proximate the radially inner stator surface, thereby establishing an airgap therebetween;

wherein:

the rotor includes a fluid circulation arrangement having plurality of fluid channels, each extending through the rotor to the radially outer rotor surface and configured to receive a liquid via a first passage and a gas via at least one second passage and direct the liquid and the gas, via centrifugal force, into the airgap as the rotor rotates inside the stator sufficiently to discharge the liquid and the gas out of the airgap at the axially opposite ends of the rotor, thereby cooling the electric motor;

the fluid circulation arrangement additionally includes a rotor impeller defining the plurality of fluid channels, and wherein the radially outer rotor surface defines circumferentially distributed apertures fluidly connected to the respective plurality of fluid channels;

the rotor impeller is arranged along the rotational axis centrally within the rotor;

the rotor has a three-piece structure, including a first lateral rotor portion and a second lateral rotor portion sandwiching the rotor impeller;

the rotor impeller has a laminate impeller structure, including a first impeller lamination and a second impeller lamination sandwiching a third impeller lamination, and together with the first and second lateral rotor portions defining each of the fluid channels;

the third impeller lamination and the first and second lateral rotor portions together define a first part of each fluid channel; and the first and second impeller laminations together define a second part of each fluid channel.

18. The radial flux electric motor according to claim 17, wherein the fluid circulation arrangement additionally includes a rotor shaft positioned coaxially with the rotor, fixed to the rotor, and defines the first passage.

19. The radial flux electric motor according to claim 18, wherein the rotor shaft defines the at least one second passage.

20. The radial flux electric motor according to claim 18, wherein the rotor defines the at least one second passage.

* * * * *